US011366318B2

(12) United States Patent
Jeon et al.

(10) Patent No.: US 11,366,318 B2
(45) Date of Patent: Jun. 21, 2022

(54) ELECTRONIC DEVICE AND CONTROL METHOD THEREOF

(71) Applicant: SAMSUNG ELECTRONICS CO., LTD., Suwon-si (KR)

(72) Inventors: Hyun-Seok Jeon, Seoul (KR); Min-Soo Koo, Seoul (KR); Yong-Woo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 523 days.

(21) Appl. No.: 16/328,439

(22) PCT Filed: Nov. 1, 2017

(86) PCT No.: PCT/KR2017/012281
§ 371 (c)(1),
(2) Date: Feb. 26, 2019

(87) PCT Pub. No.: WO2018/093075
PCT Pub. Date: May 24, 2018

(65) Prior Publication Data
US 2021/0278665 A1    Sep. 9, 2021

Related U.S. Application Data

(60) Provisional application No. 62/422,701, filed on Nov. 16, 2016.

(30) Foreign Application Priority Data

Feb. 20, 2017  (KR) ........................ 10-2017-0022294

(51) Int. Cl.
*G02B 27/01*    (2006.01)
*G06F 3/01*     (2006.01)
*G06F 3/16*     (2006.01)

(52) U.S. Cl.
CPC ........... *G02B 27/017* (2013.01); *G06F 3/012* (2013.01); *G02B 2027/0187* (2013.01); *G06F 3/167* (2013.01)

(58) Field of Classification Search
CPC .............. G02B 27/017; G02B 27/0093; G02B 2027/0138; G02B 2027/014;
(Continued)

(56) References Cited

U.S. PATENT DOCUMENTS 8,570,344 B2    10/2013 Keating et al.
2004/0219980 A1  11/2004 Bassett et al.
(Continued)

FOREIGN PATENT DOCUMENTS

JP      4694141      6/2011
JP    2011-203446   10/2011
(Continued)

OTHER PUBLICATIONS

International Search Report for PCT/KR2017/012281, dated Feb. 1, 2018, 5 pages.
(Continued)

*Primary Examiner* — Xuemei Zheng
(74) *Attorney, Agent, or Firm* — Nixon & Vanderhye, P.C.

(57) ABSTRACT

Disclosed is an electronic device. The electronic device includes: a display; a communicator comprising a circuitry, for obtaining, from an external device, an image captured by the external device and information about at least one among an acceleration and angular velocity of the external device, the acceleration and angular velocity being measured while capturing an image; and a processor for identifying a degree of movement of the external device per a preset unit time period based on the obtained information, and controlling (Continued)

the display to display the image with an adjusted field of view (FOV) based on the degree of movement.

14 Claims, 12 Drawing Sheets

(58) Field of Classification Search
CPC ........ G02B 2027/0187; G02B 27/0179; G02B 27/0172; G02B 27/0075; G02B 2027/0183; G06F 3/012
See application file for complete search history.

(56) References Cited

U.S. PATENT DOCUMENTS

| | | |
|---|---|---|
| 2011/0234475 A1 | 9/2011 | Endo |
| 2012/0200680 A1 | 8/2012 | So et al. |
| 2012/0314899 A1 | 12/2012 | Cohen et al. |
| 2014/0268356 A1* | 9/2014 | Bolas .................. G02B 27/017 359/630 |
| 2015/0352437 A1 | 12/2015 | Koseki et al. |
| 2015/0379772 A1 | 12/2015 | Hoffman |
| 2019/0172410 A1* | 6/2019 | Okumura .............. G06F 3/0346 |

FOREIGN PATENT DOCUMENTS

| | | |
|---|---|---|
| JP | 2012-100015 | 5/2012 |
| KR | 10-2012-0091585 | 8/2012 |
| KR | 10-1564964 | 11/2015 |
| KR | 10-2016-0002602 | 1/2016 |

OTHER PUBLICATIONS

Written Opinion of the ISA for PCT/KR2017/012281, with English-language Translation, dated Feb. 1, 2018, 9 pages.

\* cited by examiner (a)

(b)

(c)

ELECTRONIC DEVICE AND CONTROL METHOD THEREOF

This application is the U.S. national phase of International Application No. PCT/KR2017/012281 filed 1 Nov. 2017, which designated the U.S., claims the benefit of U.S. Provisional Application No. 62/422,701 filed 16 Nov. 2016, and claims priority to KR Patent Application No. 10-2017-0022294 filed 20 Feb. 2017, the entire contents of each of which are hereby incorporated by reference.

TECHNICAL FIELD

The disclosure relates to an electronic device and a control method thereof. More particularly, the disclosure relates to an electronic device providing a virtual reality (VR) image, and a control method thereof.

DESCRIPTION OF RELATED ART

In general, the virtual reality (VR) technology refers to a technology which enables users to experience a virtual reality similar to a reality through simulation realized by software technology.

The virtual reality may be experienced through a head mounted display device. In detail, a user wearing a head mounted display device can experience a virtual reality through head tracking through a sensor and a display provided to both eyes.

However, viewing a VR image may bring on dizziness on the user because there is a discrepancy between a visual system watching the image and a vestibular system detecting a sense of balance of the body. Accordingly, the user may feel a severe motion sickness and according to circumstances, a nausea symptom may occur.

In recent years, this phenomenon is also referred to as a virtual reality motion sickness, and measures for reducing virtual reality motion sickness have become an issue in the VR industry.

SUMMARY

Aspects of the disclosure are to address at least the above-mentioned problems and/or disadvantages and to provide at least the advantages described below. Accordingly, an aspect of the disclosure is to provide an electronic device for reducing dizziness of the user by adjusting a field of view of a displayed VR image on the basis of a capturing environment of a content, and a control method thereof.

In accordance with an aspect of the disclosure, an electronic device is provided. The electronic device includes a display, a communicator comprising a circuitry, for obtaining, from an external device, an image captured by the external device and information relating to at least one among an acceleration and angular velocity of the external device, the acceleration and angular velocity being measured while capturing an image, and a processor for identifying a degree of movement of the external device per a preset unit time period based on the obtained information, and controlling the display to display the image with an adjusted field of view (FOV) based on the degree of movement.

The image may be a virtual reality (VR) image including a left-eye stereoscopic space image generated by projecting a left-eye image to a virtual stereoscopic space and a right-eye stereoscopic space image generated by projecting a right-eye image to a virtual stereoscopic space. The processor may be configured to display an image of an area corresponding to a user's view point on each of the left-eye stereoscopic space image and the right-eye stereoscopic space image, and to perform an image processing of an outer area of the displayed image based on the degree of movement and adjust the field of view.

The processor may be configured to variably adjust a size of the outer area to be in proportion to the degree of movement.

The processor may be configured to perform a dimming processing or a blur processing to an outline of the displayed image and adjust the field of view.

The processor may be configured to, per the preset unit time period, identify a shaking intensity (SI) of the external device from the information relating to the acceleration, and identify a rotation intensity (RI) of the external device from the information relating to the angular velocity, and to identify the degree of movement based on the shaking intensity and the rotation intensity.

The degree of movement may be a motion intensity which is defined within a preset range of movement of the external device. The processor may be configured to identify the motion intensity based on a mathematical formula 1 shown below:

$$MI = \min(SI*a + RI*b, MI\_MAX) \quad \text{[Mathematical formula 1]}$$

(where MI_MAX=maximum value of preset MI, min=function returning minimum value among input values, SI=shaking intensity of external device, RI=rotation intensity of external device, a=preset SI weight, and b=preset RI weight.)

A weight of the shaking intensity may be larger than a weight of the rotation intensity.

The processor may be configured to identify the field of view based on a mathematical formula 2 shown below:

$$FOV = FOV\_MAX - (FOV\_MAX - FOV\_MIN)*MI \quad \text{[Mathematical formula 2]}$$

(where FOV_MAX=maximum value of preset field of view, FOV_MIN=minimum value of preset field of view, and MI=motion intensity.)

The outer area may include a first outer area and a second outer area. The first outer area may be an area between a first outline which is a boundary of an area corresponding to a field of view obtained from the mathematical formula 2 and a second outline which is a boundary of an area corresponding to a field of view obtained by multiplying a field of view obtained from the mathematical formula 2 by a preset value. The second outer area may be an outer area of the second outline.

The processor may be configured to perform a dimming processing or a blur processing to the first outer area, and to perform a non-transparent processing to the second outer area.

The processor may be configured to identify an acceleration of an object included in the image based on a moving distance of the object per the preset unit time period, and to adjust a field of view of the image based on the acceleration of the object.

In accordance with another aspect of the disclosure, a method for controlling an electronic device is provided. The method includes obtaining, from an external device, an image captured by the external device and information relating to at least one among an acceleration and angular velocity of the external device, the acceleration and angular velocity being measured while capturing an image, identifying a degree of movement of the external device per a preset unit time period based on the obtained information, and displaying the image with an adjusted field of view (FOV) based on the degree of movement.

The image may be a virtual reality (VR) image including a left-eye stereoscopic space image generated by projecting a left-eye image to a virtual stereoscopic space and a right-eye stereoscopic space image generated by projecting a right-eye image to a virtual stereoscopic space. The processor may be configured to display an image of an area corresponding to a user's view point on each of the left-eye stereoscopic space image and the right-eye stereoscopic space image, and to perform an image processing of an outer area of the displayed image based on the degree of movement and adjust the field of view.

The processor may be configured to variably adjust a size of the outer area to be in proportion to the degree of movement.

The displaying may include performing a dimming processing or a blur processing to an outline of the displayed image, and adjusting the field of view and displaying the image with the adjusted field of view.

The identifying the degree of movement may include, per the preset unit time period, identifying a shaking intensity (SI) of the external device from the information relating to the acceleration, and identifying a rotation intensity (RI) of the external device from the information relating to the angular velocity, and identifying the degree of movement based on the shaking intensity and the rotation intensity.

The degree of movement may be a motion intensity which is defined within a preset range of movement of the external device. The identifying the degree of movement may include identifying the motion intensity based on a mathematical formula 1 shown below:

$$MI=\min(SI*a+RI*b, MI\_MAX) \quad \text{[Mathematical formula 1]}$$

(where MI_MAX=maximum value of preset MI, min=function returning minimum value among input values, SI=shaking intensity of external device, RI=rotation intensity of external device, a=preset SI weight, and b=preset RI weight.)

A weight of the shaking intensity may be larger than a weight of the rotation intensity.

The adjusting the field of view may include identifying the field of view based on a mathematical formula 2 shown below:

$$FOV=FOV\_MAX-(FOV\_MAX-FOV\_MIN)*MI \quad \text{[Mathematical formula 2]}$$

(where FOV_MAX=maximum value of preset field of view, FOV_MIN=minimum value of preset field of view, and MI=motion intensity.)

The outer area may include a first outer area and a second outer area. The first outer area may be an area between a first outline which is a boundary of an area corresponding to a field of view obtained from the mathematical formula 2 and a second outline which is a boundary of an area corresponding to a field of view obtained by multiplying a field of view obtained from the mathematical formula 2 by a preset value. The second outer area may be an outer area of the second outline.

According to the various embodiments of the disclosure described above, a field of view of a VR image is adjusted on the basis of a degree of movement of a camera, and thereby dizziness caused by viewing the VR image can be reduced.

DETAILED DESCRIPTION OF EXAMPLE EMBODIMENTS

The terms used in the disclosure and the claims are general terms selected in consideration of the functions of the various embodiments of the disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed based on the overall contents and technological common sense of those skilled in the related art.

In describing embodiments, detailed description of relevant known functions or components may be omitted if it would obscure the description of the subject matter.

Further, embodiments of the disclosure are described below in detail with reference to the accompanying drawings and the descriptions stated in the accompanying drawings, but the disclosure is not limited by the embodiments.

Hereinafter, the display device according to an embodiment will be described in greater detail with reference to the accompanying drawings.

Figure 1:
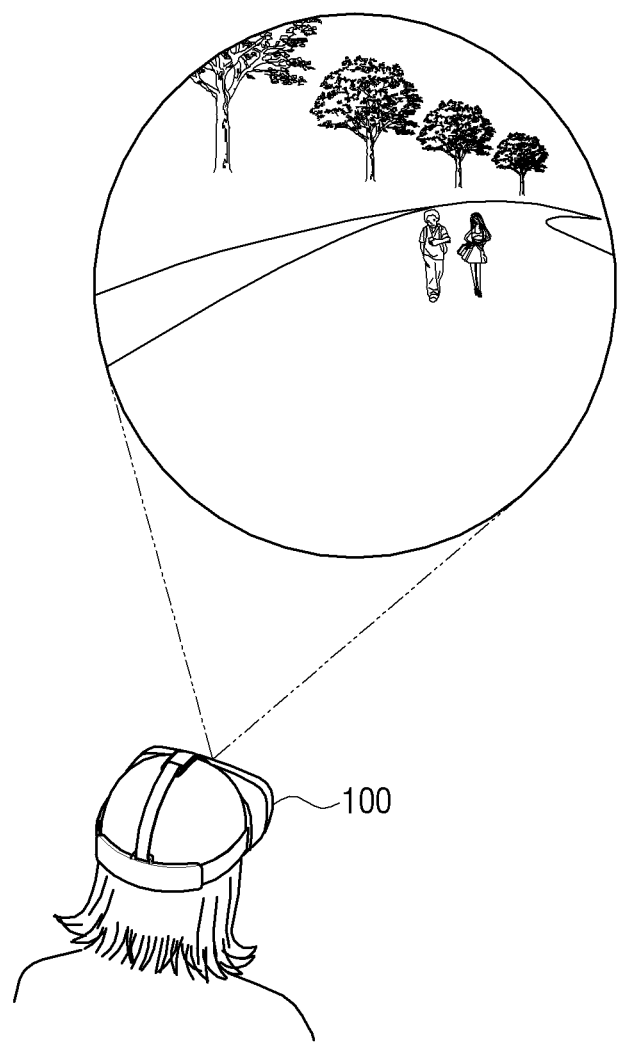
FIG. 1 is a diagram illustrating an electronic device, according to an embodiment of the disclosure.

FIG. 1 is a diagram illustrating an electronic device, according to an embodiment of the disclosure.

Referring to FIG. 1, an electronic device according to an embodiment of the disclosure may be implemented as a head mounted display (HMD) which is a display device worn on a user's head, a user terminal mounted on a VR device and providing images, or the like.

For example, the electronic device 100 may be implemented as a smartphone or tablet mounted on a front surface of a body of a VR device of a shape of glasses, a headset, a helmet or the like, and providing images to both eyes of the user. For example, in a case that the electronic device 100 is implemented as a smartphone, a display provided in the smartphone may display images closely to both eyes of the user, and accordingly the user can be provided with the images in front of his or her eyes. In this case, eyeglasses temples, bands, etc. wearable on a users head may be disposed on a rear surface of the body of the VR device, and a manipulation track pad, a return button, a volume control key, etc. may be disposed on the body of the VR device.

In addition, the electronic device 100 may include its own display, and may be implemented as a head mounted display (HMD) which is a device wearable on a user's head. In this case, the display may not be detachable but fixedly installed.

An image displayed on the electronic device 100 may be not only a two-dimensional (2D) image but also a VR image.

Here, the VR image is an image including multiple view points, which may be a three-dimensional (3D) image including a left-eye image and a right-eye image.

For example, a VR image may be a left-eye and right-eye images which are generated by dividing one image captured by moving a single camera into a left-eye image and a right-eye image, and then projecting each of the divided images onto a virtual stereoscopic circular space. In addition, a VR image may be an image which is generated by dividing an image captured by a single camera with a wide angle of view (for example, 360-degree camera) into a left-eye image and a right-eye image, and then projecting the divided images onto a virtual space. Meanwhile, the disclosure is not limited to images photographed by a camera. For example, images artificially generated, such as a game image, may correspond to a VR image. On the other hand, an image is a concept that can include both a still image and a moving image.

According to an embodiment, a VR image may be an image which is generated by dividing an image with a 360-degree view into a left-eye image and a right-eye image, and then projecting the divided images onto a virtual space. An image with a 360-degree view refers to an image in which the start and end are the same, and may be called various names such as a spherical image and an ominidirectional image. In addition, according to an embodiment, a VR image may be a panoramic image.

Meanwhile, the electronic device 100 may instantly update a displayed image by tracking a movement of a users head.

To this end, the electronic device 100 may include at least one sensor. For example, the electronic device 100 may include at least one of various sensors such as an accelerometer sensor for detecting a state of movement of the electronic device 100 and providing the corresponding signal, a gyroscope sensor for detecting of a rotation state of the electronic device 100 and providing the corresponding signal, a gravity sensor for detecting a working direction of gravity with reference to the electronic device 100 and providing the corresponding signal, or an altimeter for measuring an atmospheric pressure, detecting an altitude, and providing the corresponding signal.

The electronic device 100 may detect a user moving his or her head up and down or from side to side by means of the sensor. Accordingly, when a head direction of the user wearing the electronic device 100 is changed, the electronic device 100 may display an image of a view point corresponding to the head direction from among the entire images corresponding to the VR image. In addition, when the user wears the electronic device 100 and walks, the electronic device 100 may provide an image showing as if the user were approaching close to an object in the image shown on the display.

Accordingly, the user may experience a virtual reality (VR) by means of the electronic device 100.

Figure 2:
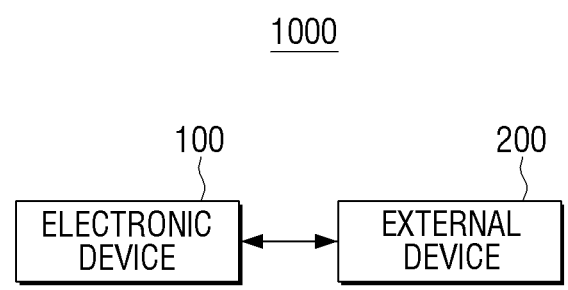
FIG. 2 is a block diagram illustrating an imaging system, according to an embodiment of the disclosure.

FIG. 2 is a block diagram illustrating an imaging system, according to an embodiment of the disclosure.

Referring to FIG. 2, an imaging system 1000 may include an electronic device 100 and an external device 200.

The electronic device 100 may obtain various data from the external device 200. To this end, the external device 200 may include various communication chips such as Wi-Fi chip, Bluetooth chip, wireless communication chip and the like, and may be connected to the electronic device 100 via a Local Area Network (LAN) or the Internet network, and may be connected to the external device in a wireless communication method such as Z-wave, 4LoWPAN, radio frequency identification (RFID), LTE D2D, BLE, GPRS, Weightless, Edge Zigbee, ANT+, NFC, IrDA, digital enhanced cordless telecommunications (DECT), wireless local area network (WLAN), Bluetooth, Wi-Fi, Wi-Fi Direct, global system for mobile communications (GSM), Universal Mobile Telecommunication System (UMTS), Long Term Evolution (LTE), wireless broadband (WiBRO), and the like. However, the example is not limited thereto, and the external device 200 may be connected to the electronic device 100 by using a wired method through a cable connection with the electronic device 100 and the like.

First, the electronic device 100 may obtain an image captured by the external device 200 from the external device 200. Here, the image is a concept that includes both still images and moving images and thus, a video may be not only a 2D image but also a VR image. For example, a VR image may be a VR image that includes a left-eye image and a right-eye image for providing a VR service.

To this end, the external device 200 may be implemented as a 360-degree camera which is capable of capturing a surrounding area of the external device 200 at a maximum degree of 360 degrees. However, the example is not limited thereto, and the external device 200 may be implemented as various devices such as a smartphone provided with a camera function, a camcorder, a camera, a wearable device such as smart glasses and a smart watch, and the like.

In addition, the electronic device 100 may obtain, from the external device 200, audio data including a sound recorded while the external device 200 captures an image. To this end, the external device 200 may include a microphone which is capable of collecting surrounding sounds.

In addition, the electronic device 100 may obtain, from the external device 200, information relating to at least one of acceleration or angular velocity of the external device 200 measured while an image is captured.

To this end, the external device 200 may include at least one of an accelerometer sensor or a gyroscope sensor. For example, the external device 200 may detect acceleration of the external device 200 itself while an image is captured by means of an accelerometer sensor, and detect an angular velocity of the external device 200 itself by means of a gyroscope sensor. However, the sensor type is not limited thereto, and the external device 200 may further include a sensor of various types for sensing acceleration and angular velocity.

In the example described above, it is described that at least one of acceleration or angular velocity of the external device 200 is measured using at least one of an accelerometer sensor or a gyroscope sensor. However, the example is not limited thereto. For example, information relating to at least one of acceleration or angular velocity of the external device 200 may be measured by at least one of an accelerometer sensor or gyroscope sensor detachable from the external device 200.

The electronic device 100 may obtain, from the external device 200, the image data, audio data and data including information relating to acceleration, and angular velocity mentioned above, respectively, and also obtain a file for which the respective data are encoded by the external device 200. The encoded file may be a file in which at least two data are encoded. For example, all of image data, audio data and data including information relating to acceleration and angular velocity may be encoded files, and only the image data and the audio data may be encoded and transmitted and the data including information relating to acceleration and angular velocity may be transmitted separately.

Accordingly, the electronic device 100 may display an image obtained from the external device 200 and an image with an adjusted field of view on the basis of information relating to at least one of acceleration or angular velocity of the external device 200 measured while an image is captured. This will be explained in detail focusing on FIG. 3 with reference to FIGS. 4, 5, 6 and 7.

Figure 3:
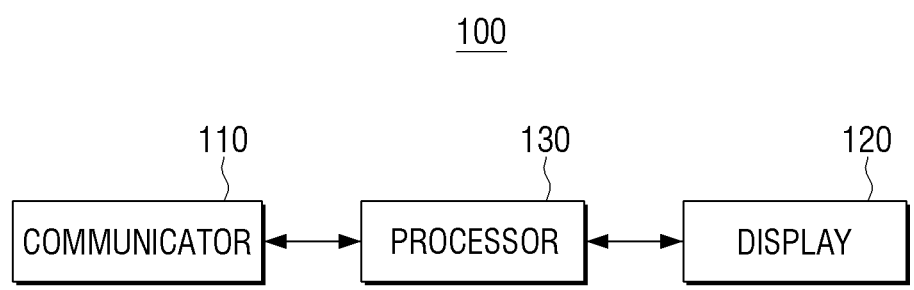
FIG. 3 is a block diagram illustrating an electronic device, according to an embodiment of the disclosure.

FIG. 3 is a diagram illustrating an electronic device, according to an embodiment of the disclosure.

Referring to FIG. 3, an electronic device 100 according to an embodiment may include a communicator comprising a circuitry 110, a display 120, and a processor 130.

The communicator 110 may communicate with the external device 200 and obtain various data. For example, the communicator 110 may obtain, from the external device 200, the image data, audio data, data including information relating to acceleration and angular velocity mentioned above.

A network that may be used by the communicator 110 to perform communication with the external device 200 is not limited to a particular method. For example, the communicator 110 may use a mobile communication network such as 3rd Generation (3G), 3rd Generation Partnership Project (3GPP), Long Term Evolution (LTE) and the like, to perform communication with the external device 200, and may use a near field communication network such as Wi-Fi, Bluetooth and the like, as well as the mobile communication network mentioned above.

For this operation, the communicator 110 may include a Wi-Fi chip, a Bluetooth chip, or a wireless communication chip.

The display 120 may display various images. Here, the image is a concept that includes both still images and moving images and thus, a video may be not only a 2D image but also a VR image. For example, a VR image may be a 3D image that includes a left-eye image and a right-eye image for providing a VR service. In this case, the display 120 may change a view point of a displayed image according to a movement of a user wearing the electronic device 100, and display the image.

To this end, the display 120 may be implemented with various types of displays such as a liquid crystal display (LCD), an organic light emitting diode (OLED), a liquid crystal on silicon (LCoS), and a digital light processing (DLP). In addition, the display 120 may include a driving circuit, a backlight unit, and the like which may be implemented in forms such as an a-si TFT, a low temperature poly silicon (LTPS) TFT, an organic TFT (OTFT), and the like.

In a case that the electronic device 100 is implemented as a smartphone as described with reference to FIG. 1, the display 120 may be implemented as a smartphone display.

Although not illustrated in FIG. 3, the electronic device 100 may further include a speaker. Here, the speaker may output audio which is recorded while the external device 200 captures an image.

The processor 130 may be configured to control overall operations of the electronic device 100. For example, the processor 240 may control hardware components or software elements connected to the processor 240 by driving the O/S or an application program and process or compute various data. Further, the processor 130 may load and process a command or data obtained from at least one of the other components to a volatile memory and store diverse data in a non-volatile memory.

For this operation, the processor 130 may be realized a dedicated processor for performing functions (for example, embedded processor) or a generic-purpose processor for performing functions by running one or more software programs stored in a memory device (for example, a CPU or an application processor).

The processor 130 may control the communicator to obtain, from the external device 200, data including image data, audio data and data including information relating to at least one of acceleration or angular velocity.

As described above, the image data may include an image captured by the external device, the audio data may include a sound recorded while the external device 200 captures an image, and the information relating to at least one of acceleration or angular velocity may be information relating to acceleration and angular velocity of the external device 200 itself measured while an image is captured.

In this case, the processor 130 may respectively obtain the image data, the audio data, and the information relating to at least one of acceleration and angular velocity from the external device 200, and also obtain a file encoded by the external device 200. For example, in a case that an encoded file is obtained, the electronic device 100 may decode the encoded file into data including image data, audio data, and data including information relating to at least one of acceleration or angular velocity.

Here, an image included in the image data may be a VR image as well as a 2D image. The VR image may be a 3D image that includes a left-eye image and a right-eye image for providing a VR service.

For example, an image obtained from the external device 200 may be a VR image including a left-eye stereoscopic space image and right-eye stereoscopic space image generated by respectively projecting a left-eye image and a right-eye image onto a virtual stereoscopic space.

Figure 4:
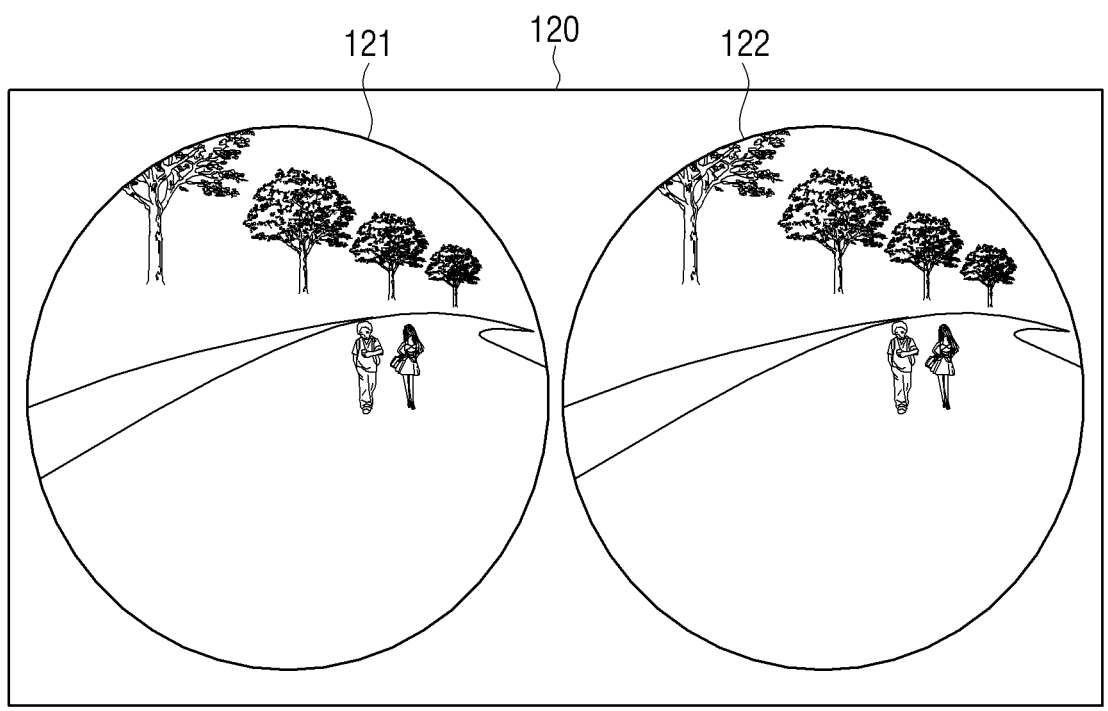
FIG. 4 is a diagram illustrating an electronic device displaying a virtual reality (VR) image including a left-eye image and a right-eye image, according to an embodiment of the disclosure.

In this case, the processor 130 may, as illustrated in FIG. 4, display a left-eye stereoscopic space image 121 on a display area viewed by a user's left eye, and display a right-eye stereoscopic space image 122 on a display area viewed by a users right eye.

In addition, the processor 130 may detect a movement of the electronic device 100 by means of a sensor (not illustrated) such as an accelerometer sensor or gyroscope sensor provided in the electronic device 100 or detect users eyes by means of an infrared sensor (not illustrated), and thereby an image of an area corresponding to a users view point in the left-eye stereoscopic space image and the right-eye stereoscopic space image can be respectively displayed.

Accordingly, in a case that the electronic device 100 is implemented as a user terminal mounted on a HMD or a VR device, the electronic device 100 may provide a stereoscopic image to the user.

An image obtained from the external device 200 is an image actually captured by the external device 200, and thus a screen shaking phenomenon may occur. For example, in a case that the image is an image captured while the user is riding a bicycle, the external device 200 may move from side to side or up and down according to a road condition, and accordingly, in an image captured by the external device 200, a screen shaking phenomenon in which the image moves from side to side or up and down may occur. That is, a screen shaking phenomenon may occur by the degree of movement of the external device 200.

However, this screen shaking phenomenon may be an element causing motion sickness in a user viewing an image. Accordingly, it is necessary to determine the degree of movement of the external device 200 and adjust a field of view of an image to thereby reduce virtual reality motion sickness. Here, when the user is wearing the electronic device 100, a field of view may be an angle from the electronic device 100 to left and right outlines of an image displayed by the electronic device 100

To this end, the processor 130 may identify the degree of movement of the external device 200. For example, the processor 130 may identify the degree of movement of the external device 200 occurring while the image is captured on the basis of information relating to at least one of acceleration or angular velocity obtained from the external device 200.

In this case, the processor 130 may identify the degree of movement of the external device 200 per a preset unit time period. For example, the processor 130 may identify the degree of movement of the external device 200 in units of 0.1 second. However, the example is not limited thereto, and a unit time period may differ according to users settings. For example, in a case that a movement of the electronic device 200 is to be identified more precisely, a unit time period may be set to less than 0.1 second. Likewise, the processor 130 may identify a shaking intensity and rotation intensity of the external device 200 which will be described below, used to identify the degree of movement of the external device 200 per a preset unit time period as well.

Meanwhile, a degree of movement of the external device 200 may be defined as a motion intensity within a preset movement range of the external device 200. For example, the degree of movement of the external device 200 may be defined as a motion intensity of a predetermined value between 0 and 1, and the motion intensity may be increased with the increase in the degree of movement of the external device 200.

For example, the processor 130 may identify a motion intensity of the external device 200 by using the mathematical formula 1 shown below.

$$MI=\min(SI*a+RI*b,MI\_MAX)$$ [Mathematical formula 1]

(where MI=motion intensity, MI=MI_MAX=maximum value of preset MI, min=function returning a minimum value among input values, SI=shaking intensity of external device, RI=rotation intensity of external device, a=preset SI weight, and b=preset RI weight.)

The SI (shaking intensity of the external device) may be a value defined on the basis of the degree of shaking of the external device 200 within a preset range. For example, the shaking intensity of the external device 200 may be defined as a predetermined value between 0 and 1, and the shaking intensity may be increased with the increase in the degree of shaking of the external device 200.

For example, the processor 130 may identify a shaking intensity of the external device 200 on the basis of information relating to acceleration obtained from the external device 200. For example, if the acceleration of the external device 200 is a1 at a t1 second, a2 at a t2 second, and a3 at a t3 second, the processor 130 may identify a change amount of acceleration of a period from t1 to t2 from a1 and a2, and identify a change amount of acceleration of a period from t2 to t3 from a2 and a3. Accordingly, a shaking intensity of the external device 200 calculated by the processor 130 may be increased with the increase in the identified change amount of acceleration.

The acceleration information obtained from the external device 200 may include information relating to acceleration measured by a 3-axis accelerometer sensor including an x-axis and a y-axis perpendicular to each other and a z-axis.

In this case, the processor 130 may identify an amount of change in acceleration of the external device 200 by the x-axis, y-axis and z-axis per a preset unit time period. Accordingly, the processor 130 may respectively identify amounts of change in acceleration according to a front and rear direction, a up and down direction, and a left and right direction, and calculate a shaking intensity of the external device on the basis of the acceleration change amount of the external device 200 according to the respective directions. As described above, a shaking intensity of the external device 200 obtained by the processor 130 may be increased with the increase in the acceleration change amount of the external device 200 according to the respective directions.

The SI (shaking intensity of the external device) may be a value defined on the basis of the degree of shaking of the external device 200 within a preset range. For example, the rotation intensity of the external device 200 may be defined as a predetermined value between 0 and 1, and the rotation intensity may be increased with the increase in the degree of rotation of the external device 200.

For example, the processor 130 may identify a rotation intensity of the external device 200 on the basis of angular velocity information obtained from the external device 200. For example, if the angular velocity of the external device 200 is w1 at a t1 second, w2 at a t2 second, and w3 at a t3 second, the processor 130 may identify a change amount of angular velocity of a period from t1 to t2 from w1 and w2, and identify a change amount of angular velocity of a period from t2 to t3 from w2 and w3. Accordingly, a rotation intensity of the external device 200 calculated by the processor 130 may be increased with the increase in the identified change amount of angular velocity.

The angular velocity information obtained from the external device 200 may include information relating to an angular velocity measured by a 3-axis angular velocity sensor including a pitch axis and a yaw axis which are formed at right angles and a roll axis.

In this case, the processor 130 may identify an amount of change in angular velocity of the external device 200 by the pitch axis, yaw axis and roll axis per a preset unit time period. Accordingly, the processor 130 may respectively identify amounts of change in angular velocity according to the respective directions, and calculate a rotation intensity of the external device on the basis of the angular velocity change amount of the external device 200 according to the respective directions. As described above, a rotation intensity of the external device 200 obtained by the processor 130 may be increased with the increase in the angular velocity change amount of the external device 200 according to the respective directions.

The shaking intensity weight (a) and the rotation intensity weight (b) may be preset by a user. For example, the shaking intensity weight (a) and the rotation intensity weight (b) may be set to a value between 0 and 1.

In addition, a weight of shaking intensity may be set larger than a weight of rotation intensity because a sense of motion sickness felt by the user according to the degree of shaking may be larger than a sense of motion sickness felt according to rotation. However, the example is not limited thereto, and according to circumstances, a weight of shaking intensity may be set to be larger than a weight of shaking intensity.

A maximum value (MI_MAX) of motion intensity may be set by a user. For example, if the motion intensity is set to a value between 0 and 1, a maximum value of the motion intensity is 1.

In addition, the processor 130 may identify a lesser value among a SI*a+RI*b value and a MI_MAX value as an MI, that is, a motion intensity. Here, the reason why the MI value is maintained to be less than or equal to a maximum of 1 is associated with the mathematical formula 2 which will be described later. As will be described later, it is to prevent a calculated field of view from being less than or equal to a minimum value of a preset field of view.

Thereafter, the processor 130 may adjust a field of view on the basis of an MI value calculated in the mathematical formula 1 and the mathematical formula 2. Here, when the user is wearing the electronic device 100, a field of view may be an angle from the electronic device 100 to left and right outlines of an image displayed by the electronic device 100

$$FOV=FOV\_MAX-(FOV\_MAX-FOV\_MIN)*MI \quad \text{[Mathematical formula 2]}$$

(where FOV=field of view, FOV_MAX=maximum value of preset field of view, FOV_MIN=minimum value of preset field of view, and MI=motion intensity)

Figure 5:
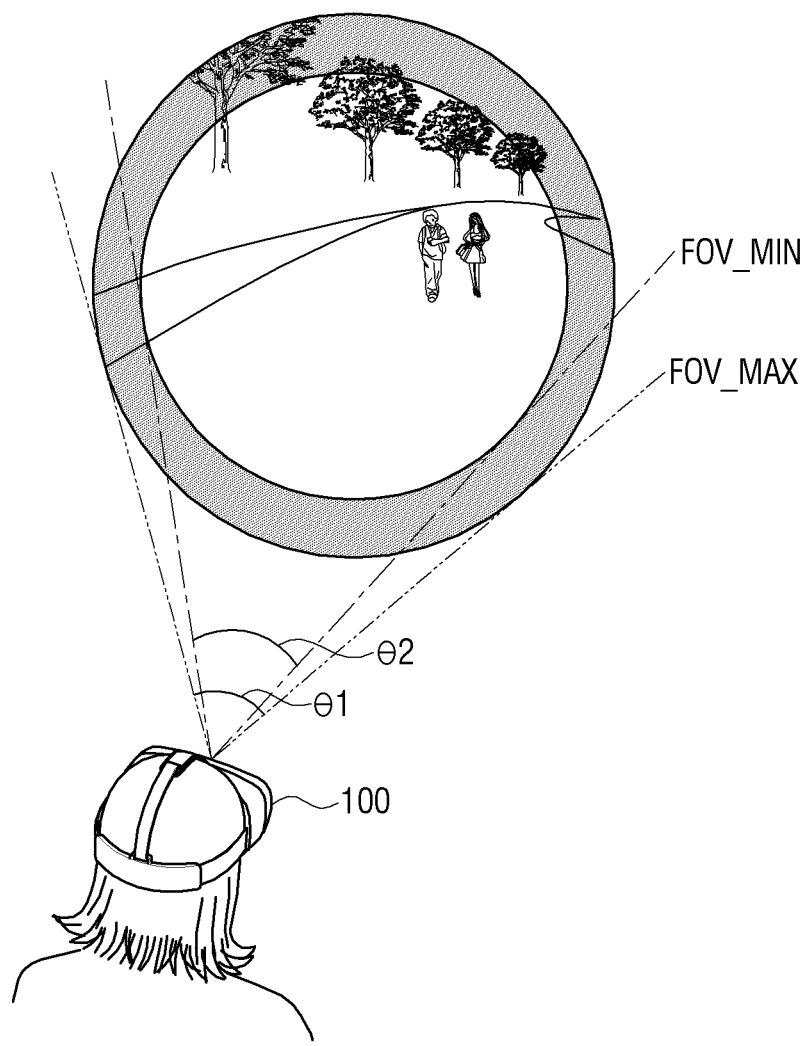
FIG. 5 is a diagram illustrating a maximum value and minimum value of a field of view, according to an embodiment of the disclosure.

The MI (motion intensity) refers to a value calculated in the mathematical formula 1. In addition, a maximum value (FOV_MAX) and minimum value (FOV_MIN) of a field of view may be preset by a user. For example, as illustrated in FIG. 5, a maximum value of a field of view may be set to $\theta 1$, and a minimum value of a field of view may be set to $\theta 2$.

The processor 130 may obtain a field of view on the basis of the mathematical formula 2. For example, if a maximum value of a field of view is 110°, a minimum value is preset to 85°, and an MI value calculated in the mathematical formula 2 is 0.9, the processor 130 may obtain a field of view of 87.5° on the basis of the mathematical formula 2.

Thereafter, the processor 130 may adjust a field of view of a displayed image on the basis of the obtained field of view. For example, the processor 130 may adjust a field of view by processing an image so that the displayed image includes the obtained field of view.

For example, the processor 130 may adjust a field of view by performing a dimming processing or a blur processing to an outer area of the displayed image.

Figure 6:
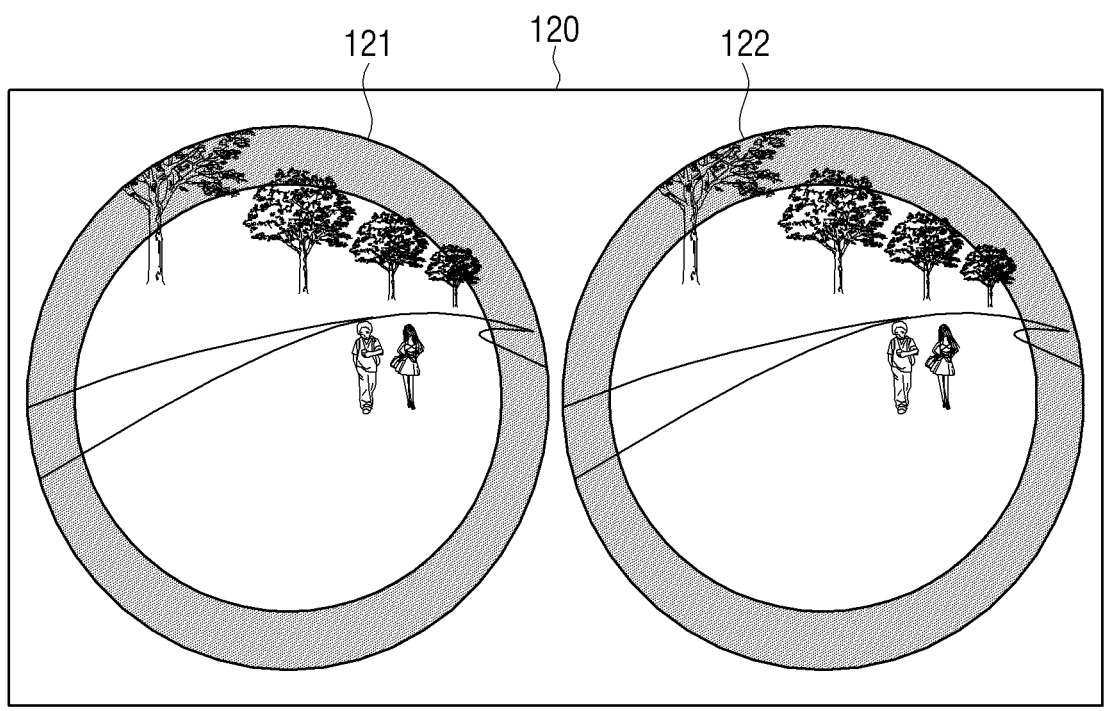
FIG. 6 is a diagram illustrating an electronic device displaying an image with an adjusted field of view, according to an embodiment of the disclosure.

That is, as illustrated in FIG. 6, the processor 130 may perform a dimming processing or a blur processing to outer areas of a left-eye image 121 and a right-eye image 122 so that the images include the field of view obtained from the mathematical formula 2. However, the example is not limited thereto, and the processor 130 may perform a non-transparent processing to the outer areas.

Figure 7:
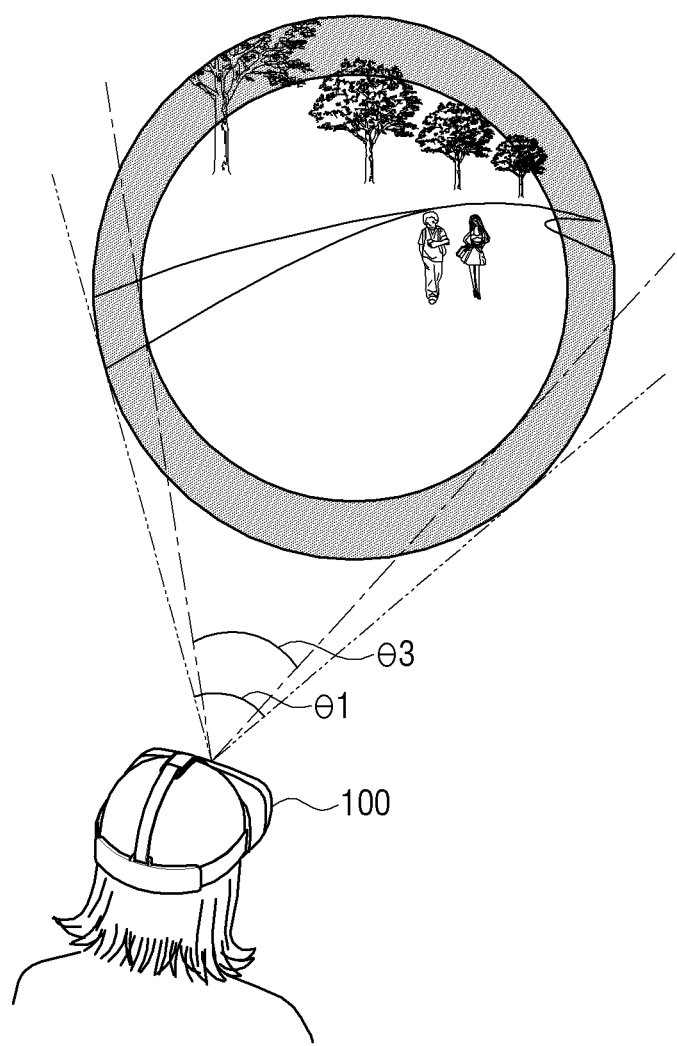
FIG. 7 is a diagram to illustrating an image with an adjusted field of view when an electronic device is implemented as a head mounted display (HMD), according to an embodiment of the disclosure.

Accordingly, as illustrated in FIG. 7, a user views an image which is processed to include an obtained field of view ($\theta 3$), that is, an image with a field of view adjusted to $\theta 3$, and thereby a virtual reality motion sickness can be reduced.

An outer area of an image with an adjusted field of view may include a first outer area and a second outer area.

Figure 8:
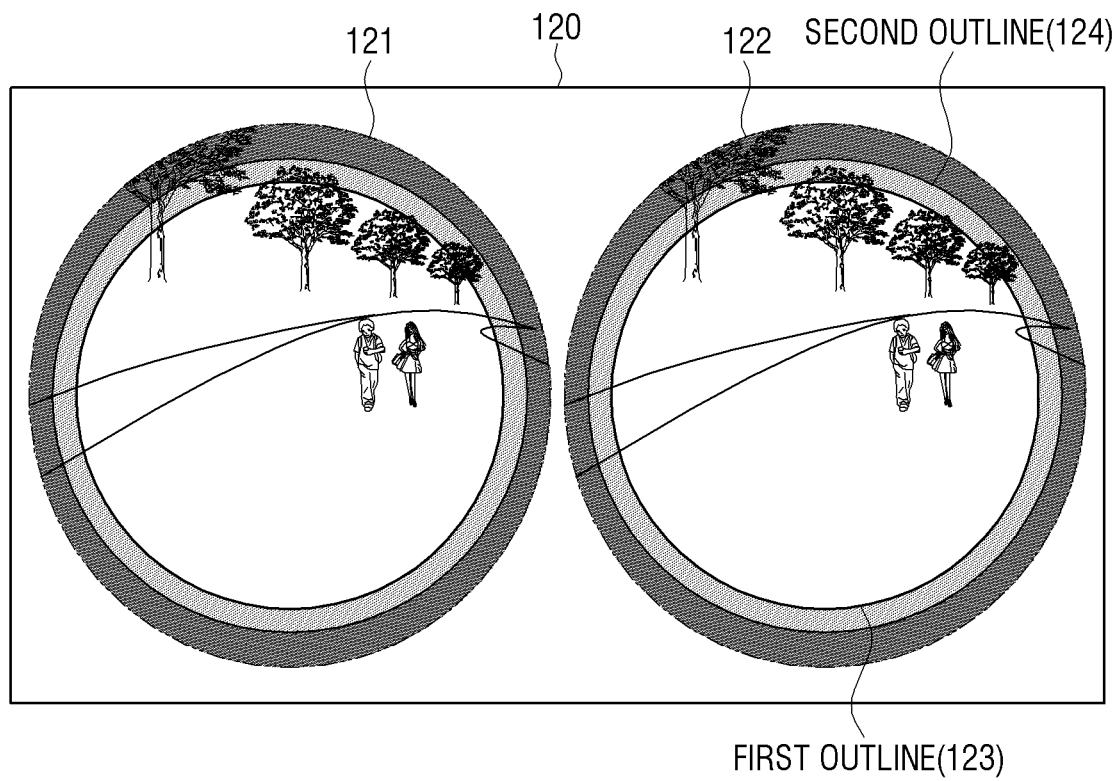
FIG. 8 is a diagram illustrating first and second outer areas, according to an embodiment of the disclosure.

FIG. 8 is a diagram illustrating first and second outer areas, according to an embodiment of the disclosure.

Here, the first outer area may be an area between a first outer line 123 which is a boundary of an area corresponding to a field of view obtained from the mathematical formula 2 and a second outer line 124 which is a boundary of an area corresponding to a field of view obtained by multiplying a field of view obtained from the mathematical formula 2 by a preset value.

For example, if a field of view obtained from the mathematical formula 2 is 87.5°, a first outline may be an outline when a field of view is adjusted to 87.5°. In addition, when multiplying 87.5°, which is a first outline, by a preset value (for example, 1.2), a second outline may be 105°.

In addition, the second outline may be an outer area of the second outline. In the embodiment described above, the second outer area may be considered as an outer area of the outline when a field of view is 105°.

In addition, the processor 130 may perform a dimming processing or a blur processing to first outlines of the left-eye image 121 and the right-eye image 122, and perform a non-transparent processing to the second outer area. However, the example is not limited thereto, and the processor 130 may perform a dimming processing or a blur processing to both the first outer area and the second outer area. Alternatively, a non-transparent processing may be performed to both the first and second outer areas.

Accordingly, a user viewing the image can vividly experience a virtual reality without virtual reality motion sickness.

Figure 9:
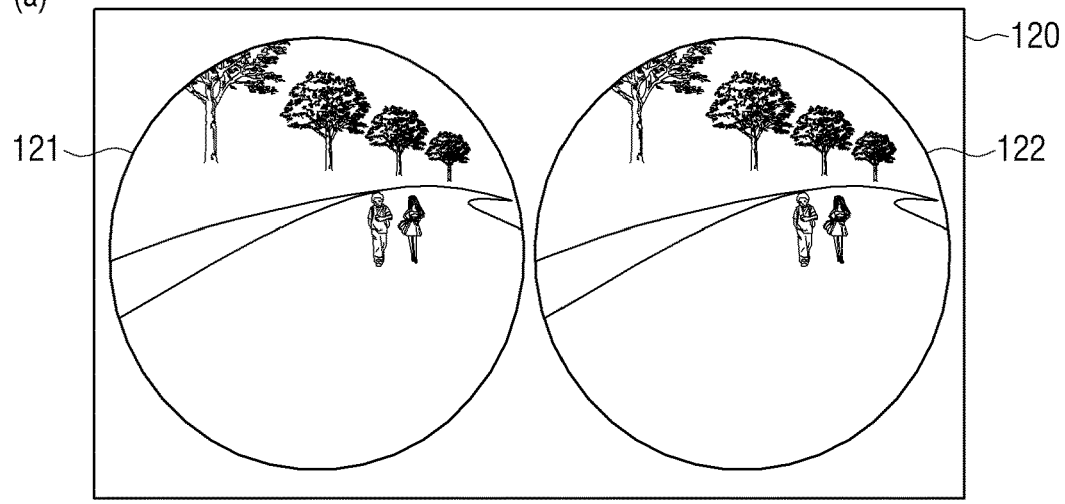
FIG. 9 is a diagram illustrating an electronic device variably adjusting a field of view and displaying an image, according to an embodiment of the disclosure.
Figure 9:
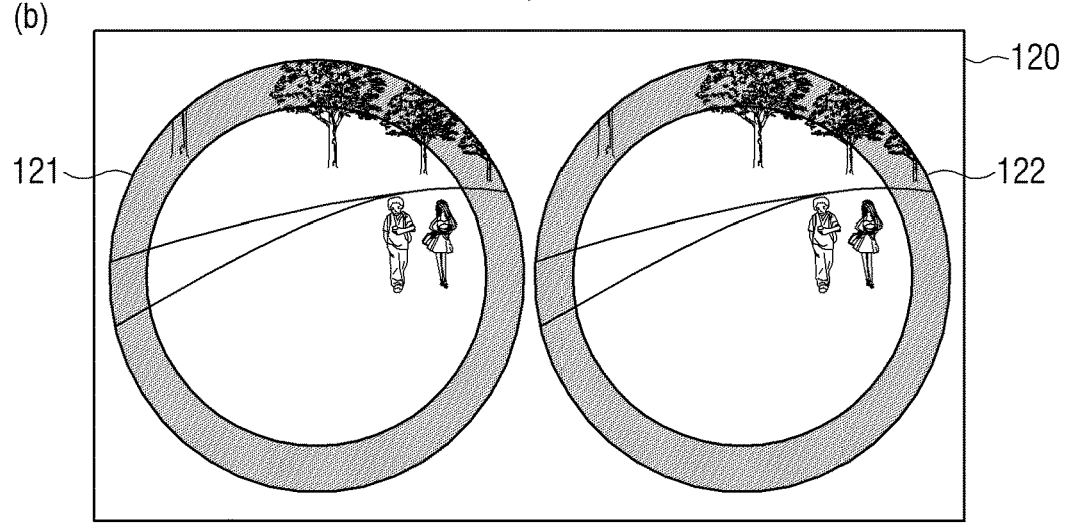
Figure 9:
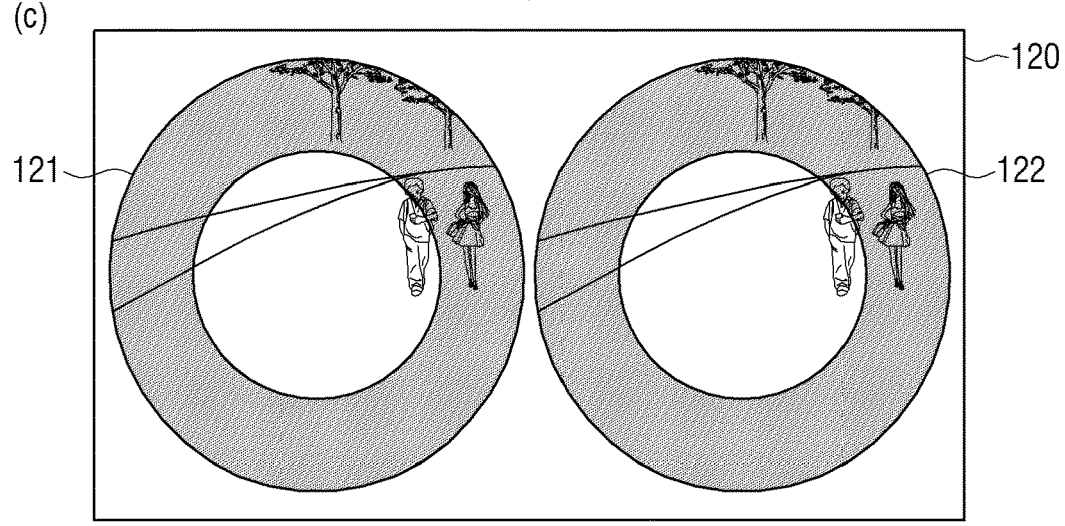

FIG. 9 is a diagram illustrating an electronic device variably adjusting a field of view and displaying an image, according to an embodiment of the disclosure.

A degree of movement of the external device 200 may differ by a preset unit time period. Accordingly, so as to reduce virtual reality motion sickness more effectively, it is necessary for the processor 130 to variably reduce a field of view.

That is, it is necessary to adjust a field of view by variably adjusting a size of outer area of a displayed image to be in proportion to the degree of movement of the external device 200.

To this end, the processor 130 may identify the degree of movement of the external device 200 per a unit time period, and obtain a field of view based on the movement of the external device 200 and adjust a field of view of an image.

For example, as illustrated in FIG. 9, the processor 130 may display an image for which a front direction of a bicycle is captured while the bicycle is stopped without adjusting field of views of the left-eye image 121 and the right-eye image 122 (FIG. 9A), and when it is determined that the degree of movement of the external device 200 is increased, display an image captured while the bicycle is ridden by reducing a size of outer areas of the displayed left-eye and right-eye images 121 and 122 (FIGS. 9B and 9C).

Accordingly, as compared with a case where a field of view of a fixed size is provided, the user can vividly experience a virtual reality more effectively with less virtual reality motion sickness.

Figure 10:
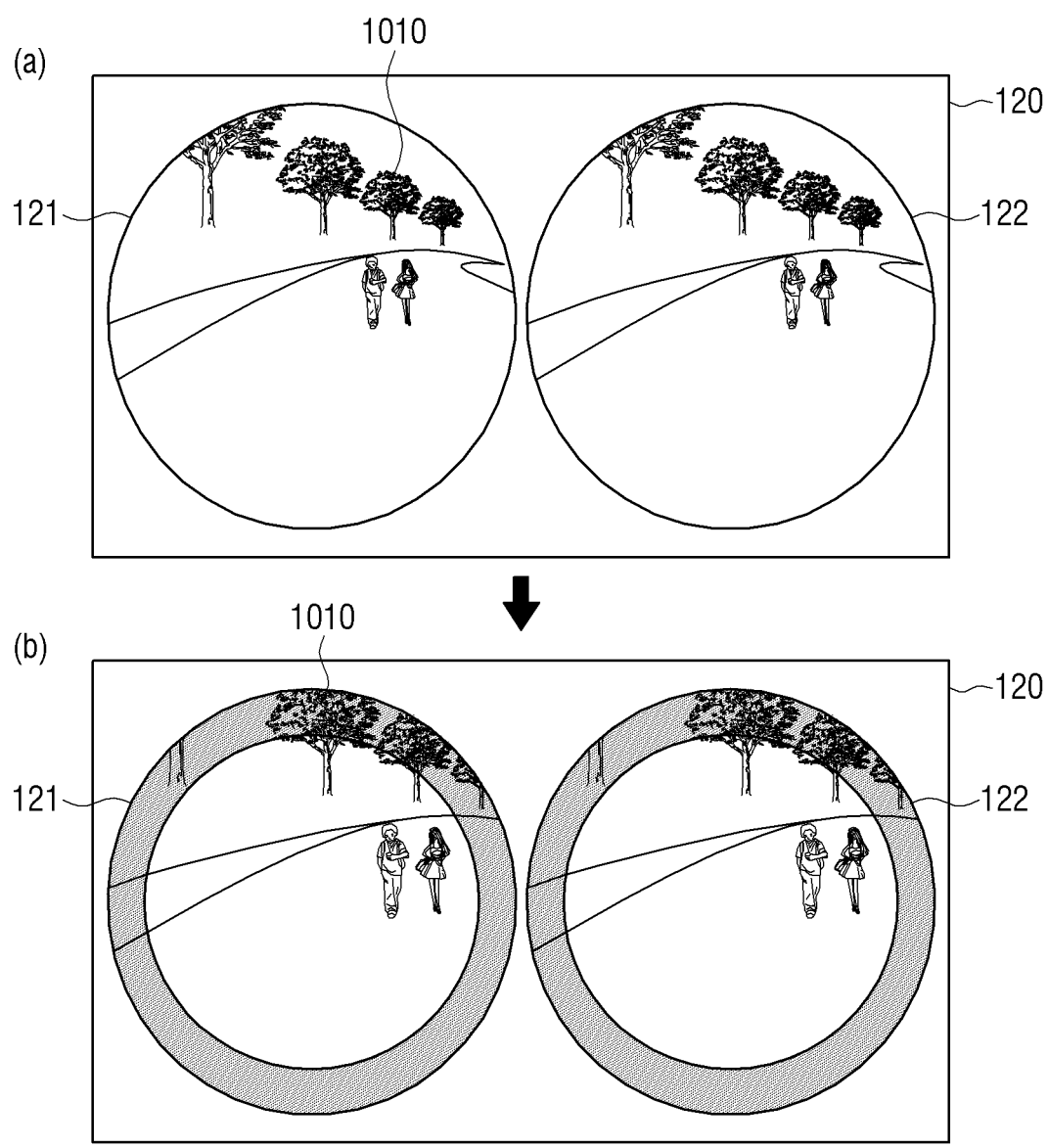
FIG. 10 is a diagram illustrating an electronic device displaying an image by adjusting a field of view on the basis of a moving distance of an object, according to an embodiment of the disclosure.

FIG. 10 is a diagram illustrating an electronic device displaying an image by adjusting a field of view on the basis of a moving distance of an object, according to an embodiment of the disclosure.

The processor 130 may, per a preset unit time period, identify acceleration of an object included in an image on the basis of a moving distance of the object, and adjust a field of view of the image on the basis of the acceleration.

For example, referring to FIG. 10, the processor 130 may identify a velocity of an object 1010 by comparing a location of an object 1010 included in an image of a t1 second (FIG. 10A) with a location of the same object 1010 included in an image of a t2 second (FIG. 10B), and differentiate the identified velocity by time and identify acceleration of the object 1010.

In this way, the processor 130 may identify a change amount of acceleration of an object per a preset unit time period, and reduce field of views of the left-eye and right-eye images 121 and 122 with the increase in change amount of acceleration and display the image. A method for adjusting a field of view is described above.

Figure 11:
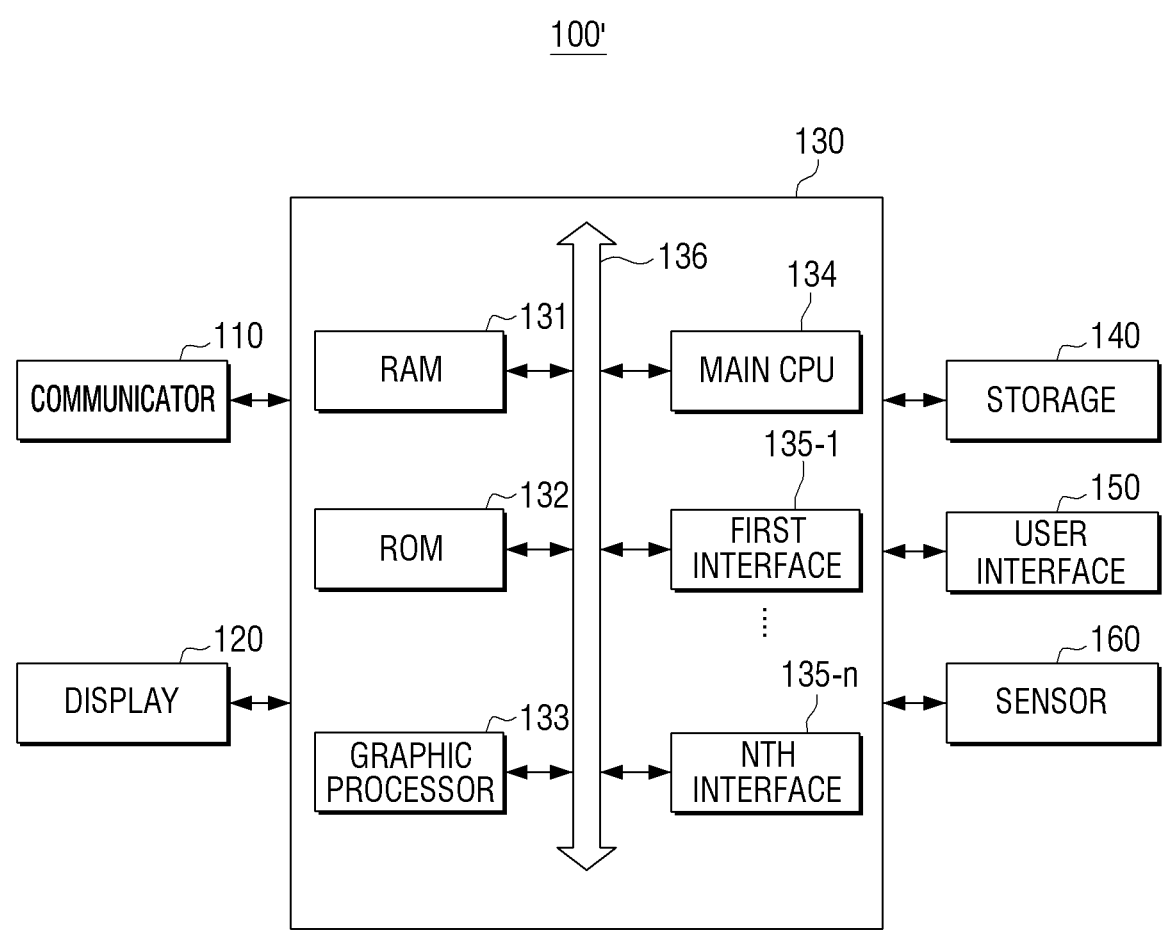
FIG. 11 is a block diagram illustrating an electronic device in detail, according to an embodiment of the disclosure.

FIG. 11 is a block diagram illustrating an electronic device in detail, according to an embodiment of the disclosure. Hereinafter, descriptions of the portion overlapping with the portion described above will be omitted.

Referring to FIG. 11, an electronic device 100' according to an embodiment of the disclosure may include a communicator 110 comprising a circuitry 110, a display 120, a processor 130, a storage 140, a user interface 150, and a sensor 160.

The storage 154 may store an operating system (OS) for controlling overall operations of the elements of the electronic device 100' and a command or data related to the elements of the electronic device 100'.

Accordingly, the processor 130 may control a plurality of hardware components or software elements of the electronic device 100' by using diverse commands or data in the storage 140, load and process a command or data received from at least one of the other components in a volatile the memory, and store diverse data in a non-volatile the memory.

The user interface 150 may obtain various user commands. For example, the user interface 150 may obtain user commands for various UI screens for controlling functions of the electronic device 100' provided via the display 120. The user interface 150 may be implemented as a keypad, touchpad or the like provided on one side of the electronic device 100', but may be implemented as a camera for recognizing motion, a microphone for recognizing voice and the like, according to circumstances.

The sensor 160 may detect a motion state of the electronic device 100'.

For example, the sensor 160 may include a magnetic sensor, gyroscope sensor, accelerometer sensor and the like for sensing a motion state. The magnetic sensor is a sensor to detect a rotation state, moving direction or the like of the electronic device 100'. The gyroscope sensor is a sensor to detect a rotation angle of the electronic device 100'. Both the magnetic sensor and the gyroscope sensor may be provided, but even when only one of them is provided, a rotation state of the electronic device 100' may be detected. The accelerometer sensor is a sensor to detect the degree of inclination of the electronic device 100'.

In addition, the sensor 160 may further include a touch sensor detecting a touch or hovering manipulation through a touch pad attached to the device, a proximity sensor, and the like.

The processor 130 may display on the display 120 an image present at a view point corresponding to a motion state detected in the sensor 160.

The processor 130 controls the overall operations of the electronic device 100'.

Particularly, the processor 130 may include a RAM 131, a ROM 132, a graphics processor 133, a main central processing unit (CPU) 134, first through nth interfaces 135-1-135-*n* (collectively "135"), and a bus 136. For example, the RAM 141, the ROM 142, the graphic processing unit 143, the main CPU 144, the first to nth interfaces 145-1 to 145-*n*, and the like may be connected to each other through the bus 146.

The first to nth interfaces 135-1-135-*n* are connected to the various elements mentioned above. One of the interfaces may also be a network interface connected to an external device through a network.

The main CPU 133 may access the storage 140, and perform booting by using an O/S stored in the storage 140. In addition, the main CPU 134 may perform various operations by using various types of programs, contents, data, etc. stored in the storage 140.

The RAM 131 stores a set of commands for system booting. If power is provided to the electronic device 100', the main CPU 134 may copy an operating system (O/S) stored in the storage 110, in the RAM 131, according to a command stored in the ROM 132, and execute the O/S so that a system is booted. When the booting is completed, the main CPU 134 may copy the various programs stored in the storage 140 to the RAM 131, and perform various operations by implementing the programs copied to the RAM 131.

The graphic processor 133 may provide a screen including various objects such as an icon, an image, a text, etc., for example, a screen obtained from the external device 200, using a calculator (not illustrated) and a renderer (not illustrated). The calculator (not illustrated) may compute attribute values, such as coordinate values, shapes, sizes, and colors of the objects, according to a layout of the screen based on the obtained control command. The renderer (not illustrated) may provide a screen including the objects in various layouts based on the attribute values computed by the calculator (not illustrated). The screen provided by the renderer (not illustrated) may be displayed on the display 120.

Figure 12:
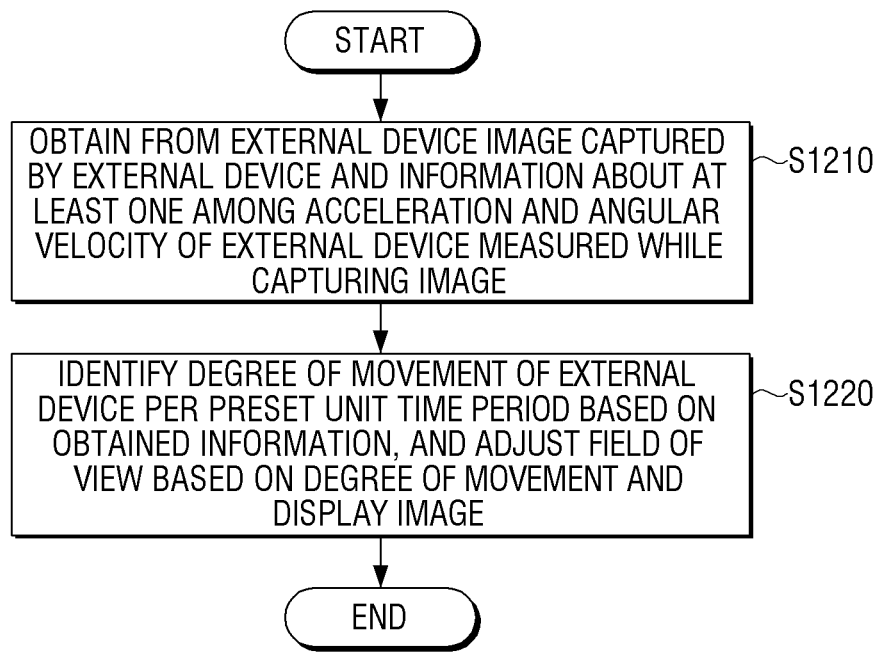
FIG. 12 is a flowchart illustrating a method for controlling an electronic device, according to an embodiment of the disclosure.

FIG. 12 is a flowchart illustrating a method for controlling an electronic device, according to an embodiment of the disclosure.

The electronic device may obtain, from an external device, an image captured by the external device and information relating to at least one among the acceleration and angular velocity of the external device measured while capturing the image, at operation S1210.

In addition, the electronic device may identify the degree of movement of the external device per a preset unit time period on the basis of the obtained information, and display the image with an adjusted field of view on the basis of the degree of movement.

The methods according to the above-described embodiments may be realized as software or applications that may be installed in the existing electronic device.

Further, the methods according to the above-described embodiments may be realized by upgrading the software or hardware of the existing electronic device.

The above-described embodiments may be executed through an embedded server in the electronic device or through an external server outside the electronic device.

A non-transitory computer readable medium in which a program sequentially performing the controlling method according to the disclosure is stored may be provided.

The non-transitory computer readable medium refers to a medium that stores data semi-permanently rather than storing data for a very short time, such as a register, a cache, a memory or etc., and is readable by a device. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the disclosure. The present teaching can be readily applied to other types of devices. Also, the description of the embodiments is intended to be illustrative, and not to limit the scope of the claims, and many alternatives, modifications, and variations will be apparent to persons having ordinary skill in the art.

What is claimed is:

1. An electronic device, comprising:
   a display;
   a communicator comprising a-circuitry, for obtaining, from an external device, an image captured by the external device and information relating to at least one among an acceleration and angular velocity of the external device, the acceleration and angular velocity being measured while capturing an image; and
   a processor in configured to:
      identify a shaking intensity (SI) of the external device from the information relating to the acceleration per a preset unit time period, and identify a rotation intensity (RI) of the external device from the information relating to the angular velocity per a preset unit time period;
      identify a degree of movement of the external device based on the shaking intensity and the rotation intensity;
      adjust a field of view (FOV) of the image of the electronic device based on the degree of movement of the external device; and
      control the display to display the image with the adjusted field of view (FOV),
   wherein the degree of movement comprises a motion intensity which is defined within a preset range of movement of the external device.

2. The electronic device as claimed in claim 1, wherein the image is a virtual reality (VR) image including a left-eye stereoscopic space image generated by projecting a left-eye image to a virtual stereoscopic space and a right-eye stereoscopic space image generated by projecting a right-eye image to a virtual stereoscopic space, and
   wherein the processor is configured to:
      display an image of an area corresponding to a user's view point on each of the left-eye stereoscopic space image and the right-eye stereoscopic space image; and
      perform an image processing of an outer area of the displayed image based on the degree of movement and adjust the field of view.

3. The electronic device as claimed in claim 2, wherein the processor is configured to variably adjust a size of the outer area to be in proportion to the degree of movement.

4. The electronic device as claimed in claim 2, wherein the processor is configured to perform a dimming processing or a blur processing to an outline of the displayed image and adjust the field of view.

5. The electronic device as claimed in claim 2, wherein the processor is configured to identify the field of view based on a mathematical formula 2 shown below:

$$FOV = FOV\_MAX - (FOV\_MAX - FOV\_MIN)*MI \quad \text{[Mathematical Formula2]}$$

where FOV_MAX=maximum value of preset field of view, FOV_MIN=minimum value of preset field of view, and MI=motion intensity.

6. The electronic device as claimed in claim 5, wherein the outer area includes a first outer area and a second outer area,
   wherein the first outer area is an area between a first outline which is a boundary of an area corresponding to a field of view obtained from the mathematical formula 2 and a second outline which is a boundary of an area corresponding to a field of view obtained by multiplying a field of view obtained from the mathematical formula 2 by a preset value, and
   wherein the second outer area is an outer area of the second outline.

7. The electronic device as claimed in claim 6, wherein the processor is configured to:
   perform a dimming processing or a blur processing to the first outer area; and
   perform a non-transparent processing to the second outer area.

8. The electronic device as claimed in claim 1,
   wherein the processor is configured to identify the motion intensity based on a mathematical formula 1 shown below:

$$MI = \min(SI*a + RI*b, MI\_MAX), \quad \text{[Mathematical Formula1]}$$

where MI_MAX=maximum value of preset MI, min=function returning minimum value among input values, SI=shaking intensity of external device, RI=rotation intensity of external device, a=preset SI weight, and b=preset RI weight.

9. The electronic device as claimed in claim 8, wherein a weight of the shaking intensity is larger than a weight of the rotation intensity.

10. The electronic device as claimed in claim 1, wherein the processor is configured to:
   identify an acceleration of an object included in the image based on a moving distance of the object per the preset unit time period; and
   adjust a field of view of the image based on the acceleration of the object.

11. A method for controlling an electronic device, the method comprising:
   obtaining, from an external device, an image captured by the external device and information relating to at least one among an acceleration and angular velocity of the external device, the acceleration and angular velocity being measured while capturing an image;
   identifying a shaking intensity (SI) of the external device from the information relating to the acceleration per a preset unit time period, and identify a rotation intensity (RI) of the external device from the information relating to the angular velocity per a preset unit time period;
   identifying a degree of movement of the external device based on the shaking intensity and the rotation intensity;
   adjusting a field of view (FOV) of the image of the electronic device based on the degree of movement of the external device; and
   displaying the image with the adjusted field of view (FOV),
   wherein the degree of movement comprises a motion intensity which is defined within a preset range of movement of the external device.

12. The method as claimed in claim 11, wherein the image is a virtual reality (VR) image including a left-eye stereoscopic space image generated by projecting a left-eye image to a virtual stereoscopic space and a right-eye stereoscopic space image generated by projecting a right-eye image to a virtual stereoscopic space, and wherein the displaying includes:

displaying an image of an area corresponding to a user's view point on each of the left-eye stereoscopic space image and the right-eye stereoscopic space image; and performing an image processing of an outer area of the displayed image based on the degree of movement, and adjusting the field of view and displaying the image with the adjusted field of view.

13. The method as claimed in claim 12, wherein the displaying includes variably adjusting a size of the outer area to be in proportion to the degree of movement and displaying the image.

14. The method as claimed in claim 12, wherein the displaying includes performing a dimming processing or a blur processing to an outline of the displayed image, and adjusting the field of view and displaying the image with the adjusted field of view.

\* \* \* \* \*